US007908794B2

(12) United States Patent
White et al.

(10) Patent No.: US 7,908,794 B2
(45) Date of Patent: Mar. 22, 2011

(54) WHEELED FLOWERPOT ASSEMBLY (76) Inventors: Paul Curtis White, Pensacola, FL (US); Ralph David Bryan, Pensacola, FL (US)

( * ) Notice: Subject to any disclaimer, the term of this patent is extended or adjusted under 35 U.S.C. 154(b) by 1163 days.

(21) Appl. No.: 11/124,930

(22) Filed: May 9, 2005

(65) Prior Publication Data
US 2006/0248797 A1    Nov. 9, 2006

(51) Int. Cl.
*A01G 9/02* (2006.01)
(52) U.S. Cl. ............................................. 47/66.6
(58) Field of Classification Search .......... 280/33.991, 280/33.998, 655, 655.1
See application file for complete search history.

(56) References Cited

U.S. PATENT DOCUMENTS

| 489,745 | A | * | 1/1893 | Juvinall | 414/456 |
| 585,931 | A | * | 7/1897 | Gridley | 47/39 |
| 1,965,986 | A | * | 7/1934 | Morgan | 403/343 |
| 2,409,786 | A | * | 10/1946 | Norton | 280/47.26 |
| 2,838,320 | A | * | 6/1958 | Sosalla | 280/47.24 |
| 3,253,850 | A | * | 5/1966 | Trusty | 294/16 |
| 4,135,725 | A | * | 1/1979 | DiRoma | 280/47.26 |
| 4,401,312 | A | * | 8/1983 | Parker | 280/47.17 |
| 4,420,168 | A | * | 12/1983 | Dewing | 280/43.1 |
| 4,638,595 | A | | 1/1987 | Rivero | |
| 5,094,031 | A | | 3/1992 | Lee | |
| 5,430,973 | A | * | 7/1995 | Luo | 47/66.6 |
| 6,000,574 | A | * | 12/1999 | Portillo | 220/736 |
| 6,073,944 | A | * | 6/2000 | Moore | 280/47.26 |
| 6,128,853 | A | | 10/2000 | Klonel et al. | |
| 6,550,860 | B2 | * | 4/2003 | Lombardi | 297/217.1 |
| 6,651,992 | B1 | * | 11/2003 | Smith, Sr. | 280/47.26 |
| 6,708,991 | B1 | * | 3/2004 | Ortlieb | 280/47.26 |
| 6,709,991 | B1 | * | 3/2004 | Kawahara et al. | 438/791 |
| 6,848,695 | B2 | * | 2/2005 | Panasewicz et al. | 280/33.998 |
| 6,925,678 | B2 | * | 8/2005 | Libman et al. | 15/257.7 |
| 2002/0125667 | A1 | * | 9/2002 | Sciulli | 280/47.26 |
| 2006/0175779 | A1 | * | 8/2006 | Zak | 280/33.998 |
| 2006/0232029 | A1 | * | 10/2006 | Parker et al. | 280/33.998 |

* cited by examiner

*Primary Examiner* — Francis T Palo
(74) *Attorney, Agent, or Firm* — Robert C. Brown

(57) ABSTRACT

A flower pot assembly including at least one axle and two wheels near a lower region of a pot-shaped element. The axle is located from the bottom of the pot by a distance greater than the radius of the wheels such that the wheels are not in contact with the surface on which the assembly rests. Tipping of the flowerpot assembly brings the wheels into contact with the surface, and further tipping frees the bottom of the pot from contact with the surface. In this attitude, the assembly may be readily wheeled to a new location. A vertical handle, preferably detachable, is attached to a side above the axle to facilitate tipping and moving. The element may be cylindrical, conical, rectangular, or any other convenient shape. Preferably, the element is tapered to facilitate stacking of pots without wheels for shipping and storage.

17 Claims, 7 Drawing Sheets

WHEELED FLOWERPOT ASSEMBLY

TECHNICAL FIELD

The present invention relates to containers for planting of herbaceous materials, referred to herein generically as "flowerpots"; more particularly, to portable flowerpots; and most particularly, to a portable flowerpot assembly wherein a flowerpot is provided with integral rolling means to permit easy relocation of a filled flowerpot by rolling.

BACKGROUND OF THE INVENTION

Flowerpots for planting of herbaceous materials are well known. Flowerpots may vary in size from the smallest pots having a volume of only a few cubic inches to large pots capable of supporting a medium-size shrub or tree. Flowerpots may be formed from any suitable formable material, such as fired terra cotta, ceramics, metals, or plastics which may be readily injection-molded or blow-molded. Flowerpots may be strictly utilitarian, as in a nursery when used for the temporary raising of stock for subsequent transplantation into the ground, or may be the permanent containers for decorative plants in homes or commercial locations.

Flowerpots typically are provided with a curved rim extending around the upper opening, which rim is readily grasped by a person wanting to transport a flowerpot. Such transport is readily accomplished by most persons when a loaded flowerpot weighs only a few pounds. However, large flowerpots when loaded may weigh 50 to 100 pounds or more and are not readily carried or transported by an unaided person. Even lighter-loaded flowerpots may not be portable by older or disabled persons. In some applications, a two-wheeled dolly having a lifting flange may be used to lift and tilt a heavy flowerpot such that it may be relocated by movement on the wheels of the dolly. In applications wherein the loaded flowerpot weighs several hundred pounds or more, a lift truck of some sort is required for relocation.

Large commercial nurseries can afford lift trucks and dollies as a part of doing business. However, a small nursery or homeowner may not have even a simple dolly for moving intermediate-sized pots from one location to another on the premises; thus, pots in the 50-100 pound range are typically moved by the age-old expedient of manual labor, at risk to the back, arms, and legs of the mover.

What is needed in the art is a simple and inexpensive means for making a flowerpot readily portable by a single operator by rolling.

It is a principal object of the present invention to move planted flowerpots without resort to lifting the flowerpots.

It is a further object of the invention to prevent injury to flowerpot workers.

SUMMARY OF THE INVENTION

Briefly described, a flower pot in accordance with the invention is formed with means for supporting integral rolling means comprising at least one axle and two wheels or a roller near a lower region of the flowerpot. As used herein, "roller" means a generally cylindrical object wherein the axial length is at least as great as the diameter. In a currently-preferred embodiment, the axle is located at a distance from the bottom of the pot greater than the radius of the wheels such that, when the assembly is in non-relocation mode the flowerpot bottom rests on a surface with the wheels or roller not in contact with the surface. The axle is also located such that tipping of the flowerpot brings the wheels into contact with the surface, and further tipping frees the bottom of the pot portion from contact with the surface. In this tipped attitude, the flowerpot may be readily rolled to a new location. When the tipping process is reversed, the flowerpot again rests on the pot bottom, the wheels again being free of the surface.

The flowerpot may be provided with a vertical handle attached to a side above the axle to facilitate tipping and moving. In a currently-preferred embodiment, the handle is detachable and preferably may comprise any convenient rod-shaped element.

The flowerpot may be cylindrical, conical, rectangular, or any other convenient shape. Preferably, the bottom of the pot is smaller than the opening to facilitate stacking of pots for shipping and storage. Preferably, the pot is provided without the axle and wheels attached and may be then assembled at point of sale or use.

In a currently preferred embodiment, a pot is provided with a groove or slot formed in the bottom of the pot, and a two-wheel truck is removably inserted into the groove by tipping of the pot as by use of the handle.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
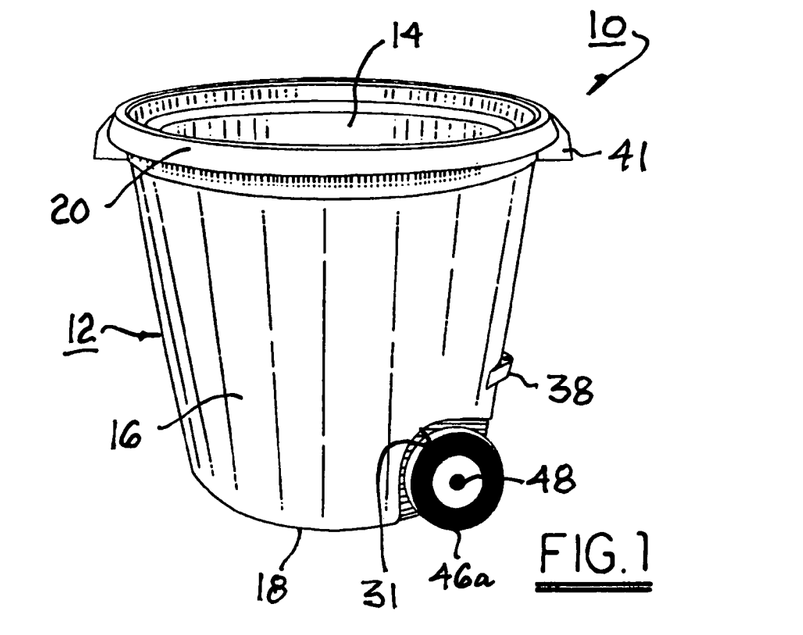
FIG. 1 is an isometric view from the side of a wheeled flowerpot assembly in accordance with the invention.
Figure 2:
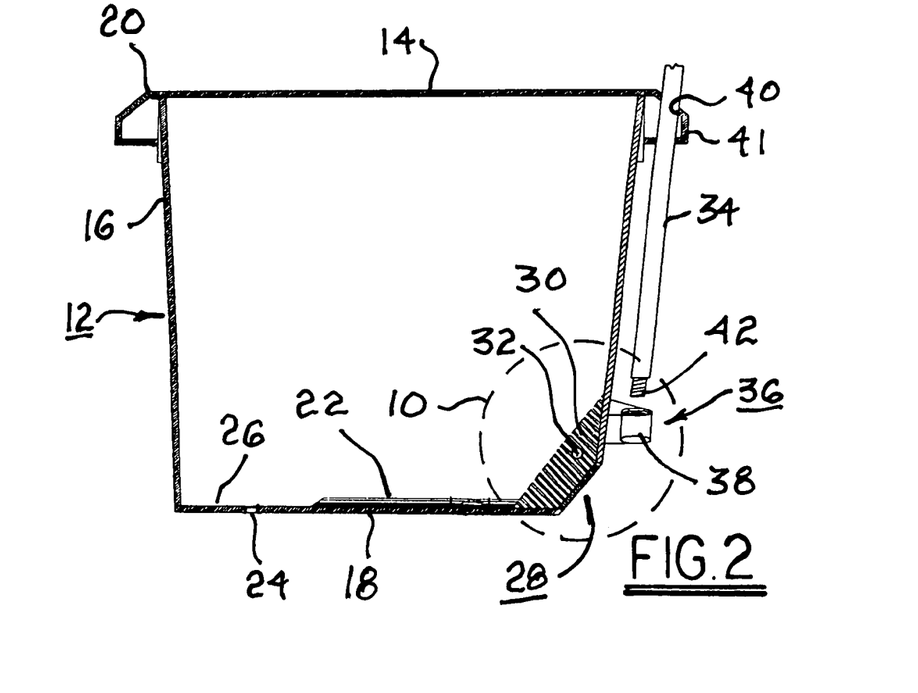
FIG. 2 is an elevational cross-sectional view of the wheeled flowerpot assembly shown in FIG. 1, showing a first embodiment of a detachable handle.

Referring to FIGS. 1 and 2, a wheeled flowerpot assembly 10 in accordance with the invention comprises a pot-shaped element 12 having an upper opening 14, generally upright arcuate sides 16, and a bottom 18 for holding planting medium and one or more living plants. Preferably, sides 16 taper inward from a rim 20 surrounding opening 14 to bottom 18. Rim 20 is formed in an outward roll to provide structural rigidity of pot-shaped element 12 at opening 14 and also to provide ready means for lifting element 12 when empty or tipping of element 12 when full. Bottom 18 preferably includes an elevated central portion 22 to promote water drainage through a plurality of drain holes 24 through peripheral bottom portion 26. Element 12 may be formed out of any suitable materials, including but not limited to fired terra cotta, ceramics, metals, or plastics which may be readily injection-molded or blow-molded.

Element 12 preferably is formed having a beveled region 28 over a portion of the intersection of sides 12 and bottom 18, including a reinforced region 30, having outboard wheel wells 31, for supporting a load when flowerpot 10 is in relocation mode. In a first embodiment for wheeled support (see also FIG. 5), a bore 32 is provided in reinforced section 30 for receiving an axle, as described below.

Still referring to FIG. 2, element 12 is provided with means for receiving a handle 34 to facilitate tipping and relocating of flowerpot 10, which handle preferably is detachable and is not a necessary element of the invention. It is an important advantage of the invention that any convenient rod-shaped object, such as a broomstick or mop handle, can function as handle 34. In a first handle embodiment 36, shown in FIG. 2, pot-shaped element 12 is provided with a socket 38, attached to or formed in the outer surface of a wall 12 at reinforced region 30, and with an opening 40 in a reinforcement 41 of rim 20 for passage of detachable handle 34. The lower end 42 of handle 34 is receivable in socket 38, and optionally both may be mutually threaded to securely retain handle 34 in socket 38 during tipping and relocating maneuvers. Socket 38 optionally may be detachable from element 12 when relocation is complete or for nested shipping or storage of multiple pots.

Figures 5, 6:
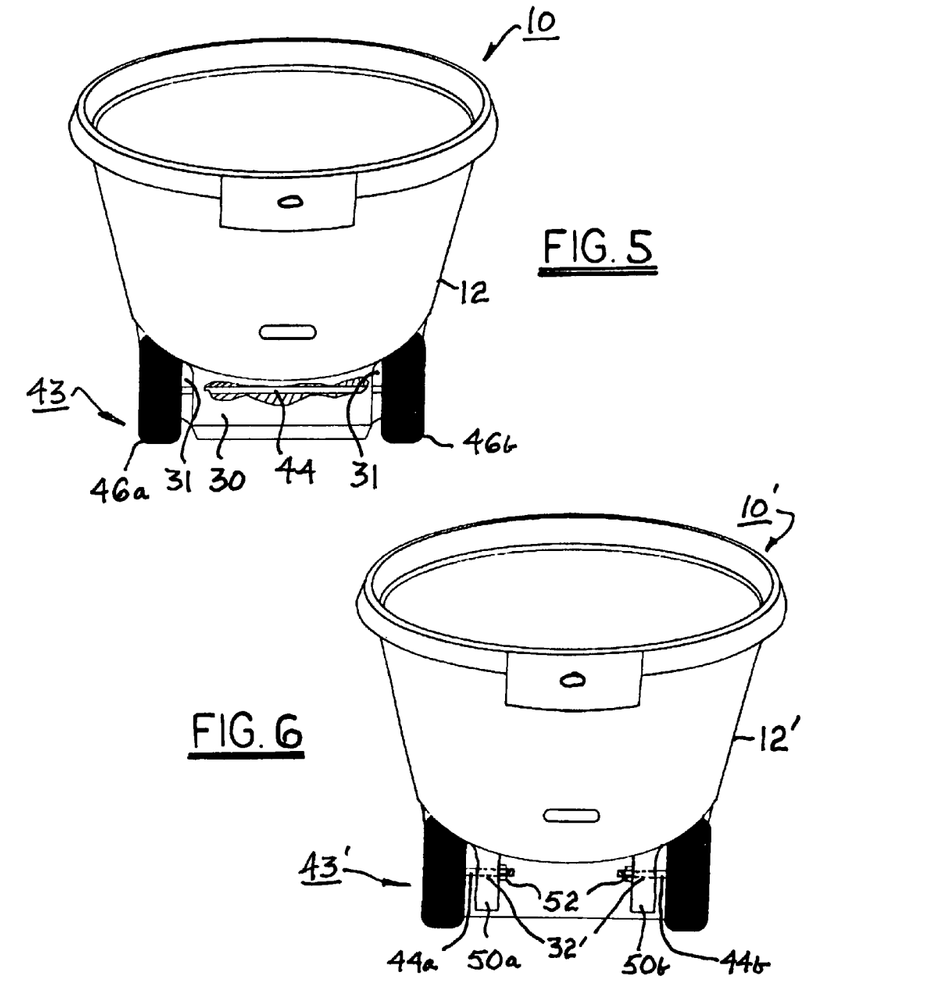
FIG. 5 is a rear elevational view of a wheeled flowerpot assembly showing a first embodiment of a continuous axle and wheels.
FIG. 6 is a rear elevational view of a wheeled flowerpot assembly showing a second embodiment of a split axle and wheels.

Referring to FIGS. 1 and 5, in embodiment 43 of rolling means in accordance with the invention, a continuous rod-shaped axle 44 is disposed in reinforced region 30 through bore 32, extending therefrom at each end. First and second wheels 46a,46b are mounted in known fashion on the extending ends of axle 44 and secured thereupon by fastener means 48, preferably removable, for example, frictional caps as are known in the prior art of wheeled vehicles.

Referring now to FIG. 6, in a second rolling means embodiment 43', pot-shaped element 12' is provided with first and second flanges 50a,50b generally in lieu of reinforced region 30 and having individual bores 32' therethrough for receiving first and second stub-axles 44a,44b which may be secured thereto as by nuts 52. Wheels 46a,46b are mounted to axles 44a,44b as in the first axle embodiment.

In both axle embodiments, it is preferable that axle 44 be positioned with respect to the bottom of the pot-shaped element such that a load is not imposed on the wheels when the assembly is in non-relocation mode, to prevent the wheels' developing flat spots; thus the distance 33 from the axle axis to the bottom of the pot is preferably slightly greater than the radius 35 of the wheels 46 (FIG. 2). However, this is not a requirement of the invention, and all configurations of an integral wheel assembly with a pot-shaped element are intended to be fully comprehended by the invention.

Figure 3:
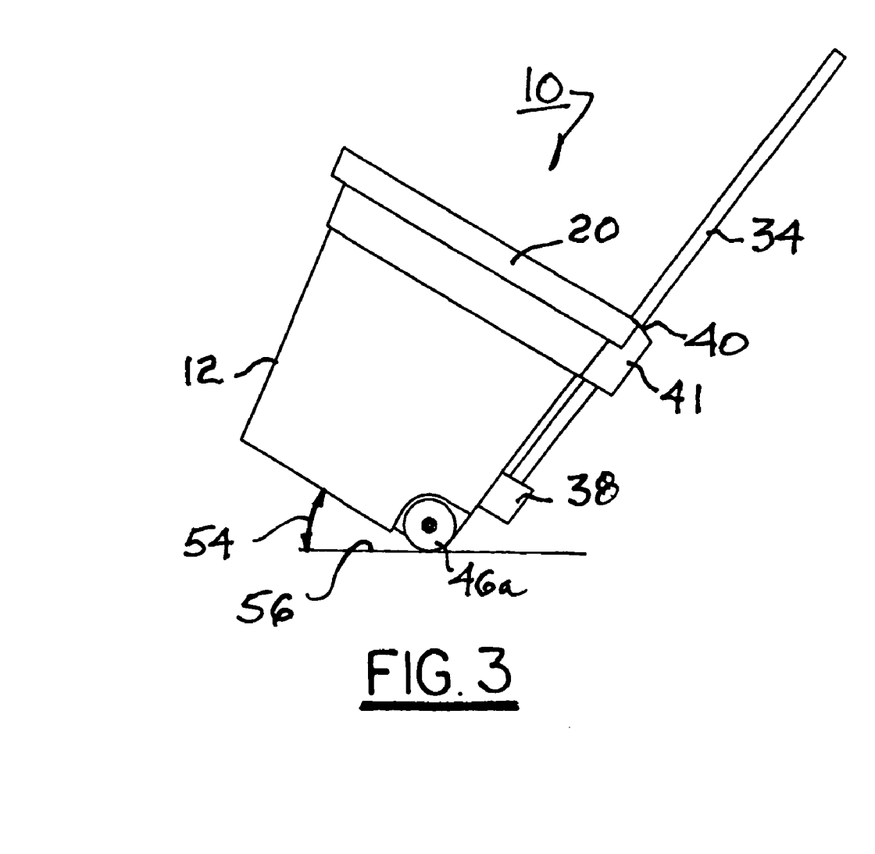
FIG. 3 is a side elevational view of a wheeled flowerpot assembly in accordance with the invention tipped into position for relocation.
Figure 4:
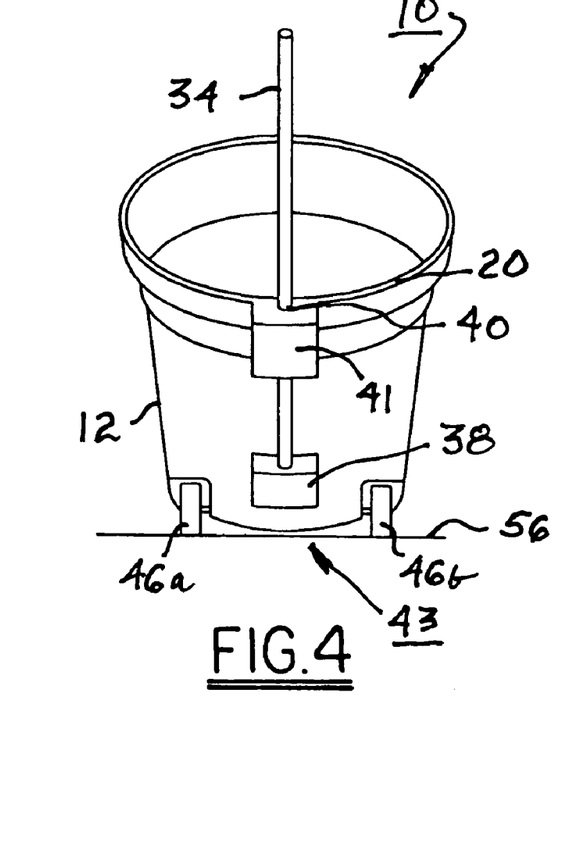
FIG. 4 is a rear elevational view of the wheeled flowerpot assembly shown in FIG. 3.

Referring now to FIGS. 2, 3, and 4, in a method for using a wheeled flowerpot assembly 10 in accordance with the invention, a detachable handle 34 is inserted through opening 40 in reinforcement 41 of rim 20 and into socket 38. Handle 34 then is depressed by an operator (not shown) such that assembly 10 is pivoted through an angle 54 such that wheels 46a,46b become engaged with a surface 56 upon which assembly 10 rests, and such that pot-shaped element 12 is raised from contact with surface 56. In the resulting pivoted position, the assembly is ready for relocation by being rolled along surface 56 on wheels 46a,46b. When relocation is complete, the pivoting process is reversed and handle 34 may be detached and removed.

Figure 7:
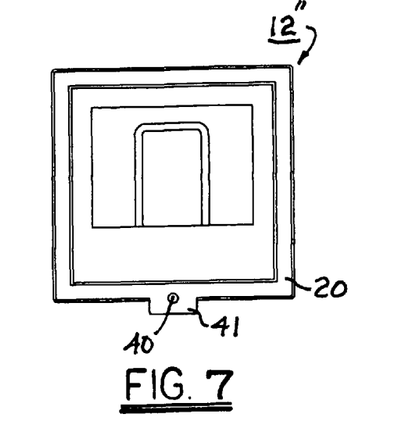
FIG. 7 is a plan view of a rectangular wheeled flowerpot assembly in accordance with the invention.
Figure 8:
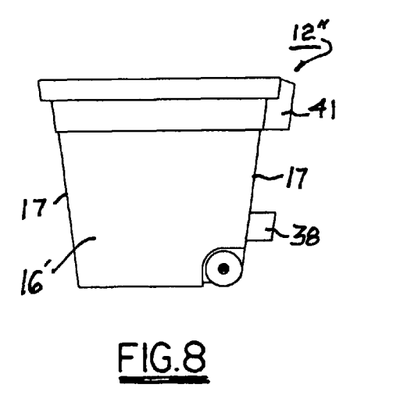
FIG. 8 is a a side elevational view of a rectangular wheeled flowerpot assembly in accordance with the invention.
Figure 9:
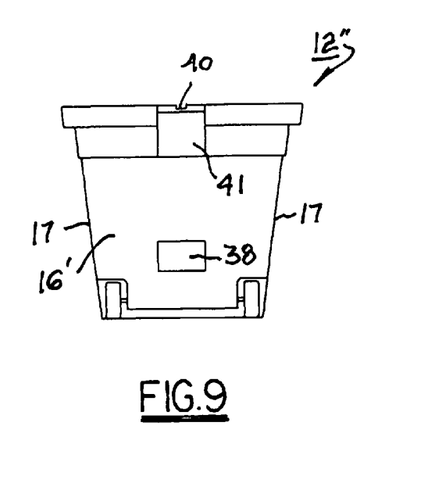
FIG. 9 is a rear elevational view of a rectangular wheeled flowerpot assembly in accordance with the invention.

Referring now to FIGS. 7 through 9, a pot-shaped element 12" in accordance with the invention may assume a rectangular shape wherein sides 16' are substantially planar and meet a corners 17. The arrangement of wheels, axles, and handle is the same as for embodiment 12.

Figure 10:
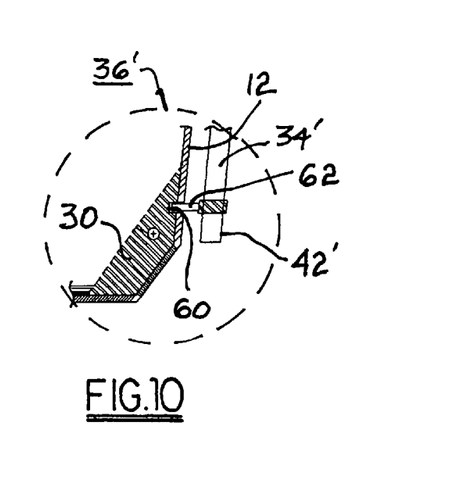
FIG. 10 is a detailed view taken in circle 10 in FIG. 2, showing a second embodiment of attachment means for a detachable handle.

Referring to FIG. 10, an alternative arrangement 36' for attachment of a handle 34' includes a detent 60 formed in the side of element 12, preferably in reinforced region 30, for receiving a pin 62 transversely mounted on handle 34'. Preferably, opening 40 in rim 20 is modified (not shown) to accommodate passage of pin 62 during insertion of handle 34' therethrough. In use, the pin end 42' of handle 34' is inserted through opening 40 and the handle is extended downwards until pin 62 is opposite detent 60. The handle is then rotated to bring pin 62 into locking engagement with detent 60. The flowerpot assembly may then be maneuvered as described above and shown in FIGS. 3 and 4.

Figure 11:
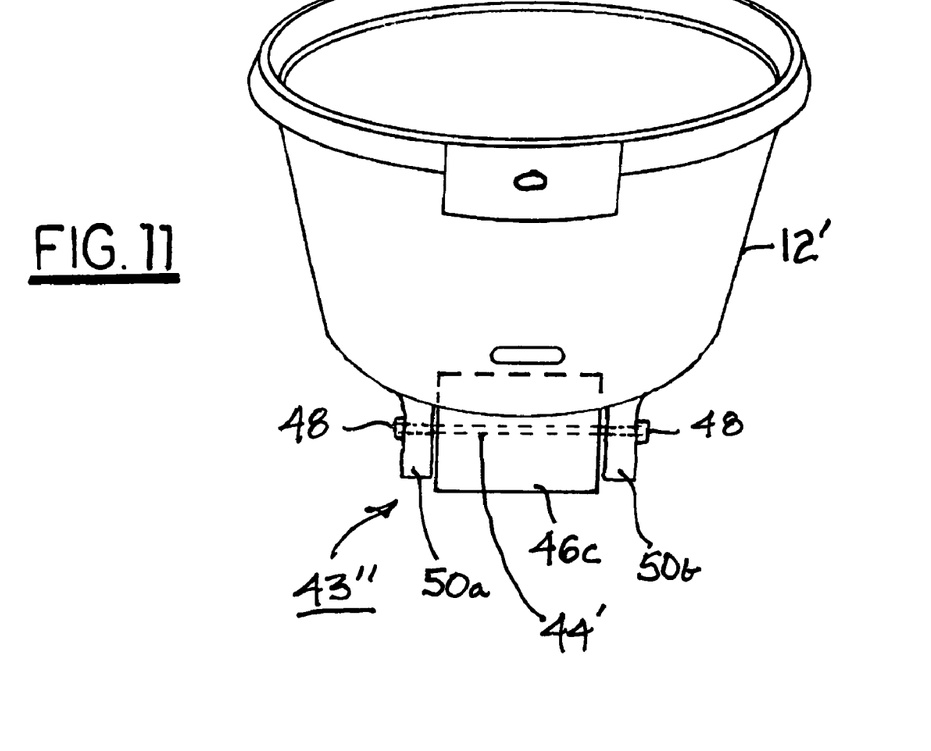
FIG. 11 is a rear elevational view of a wheeled flowerpot assembly showing use of a single roller in place of wheels.

Referring now to FIG. 11, in a third rolling means embodiment 43", a single roller 46c may be substituted for wheels 46a,46b when using pot-shaped element 12' as shown in FIG. 7. Roller 46c is conveniently disposed between flanges 50a, 50b on a single axle 44' capped with fastener means 48 outboard of the flanges. Embodiment 43' requires formation of a roller well (not visible) in element 12' analogous to wheel wells 31 (FIG. 1).

All variations on structures of flowerpot assembly 10 discussed hereinabove feature axles and wheels that are permanently mounted to the pot 12. However, flowerpot assemblies wherein the axles and wheels may be installed for relocation of the assembly and may be removed following relocation are fully contemplated by the invention.

Figure 12:
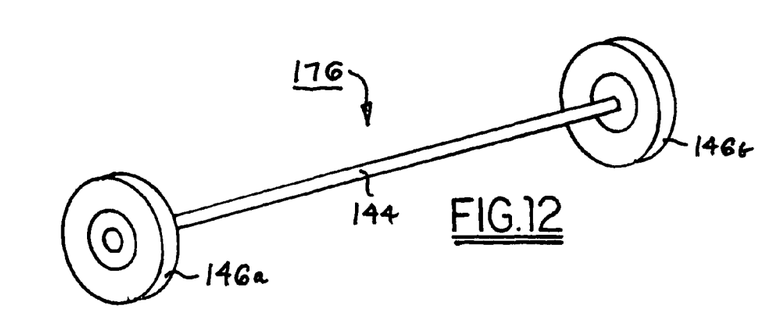
FIG. 12 is an isometric view of a first embodiment of a two-wheel truck in accordance with the invention.
Figure 13:
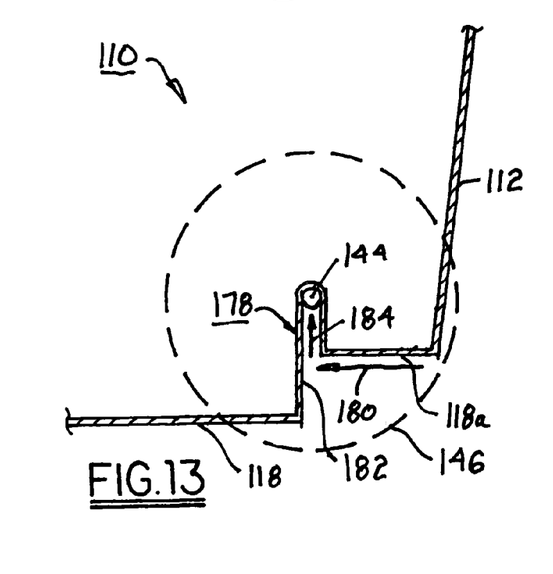
FIG. 13 is a cross-sectional view of a portion of a pot in accordance with the invention showing a first embodiment of a slot for receiving the truck shown in FIG. 12.

Referring now to FIGS. 12 and 13, a first removable truck 176 comprises first and second wheels 146a,146b mounted to opposite ends of an axle 144 such that truck 176 may be rolled along a surface, preferably without rotation of axle 144. A flowerpot 110 otherwise similar in construction to flowerpot 10 is provided with a transverse slot 178 formed in bottom 118 for receiving axle 144 of truck 176. Preferably, bottom 118 is slightly stepped 118a as shown in FIG. 13 such that axle 144 may be inserted readily into slot 178 by tipping pot 110 slightly, allowing truck 176 to be rolled in first direction 180 until wall 182 is encountered. When the tipping of pot 110 is reversed, axle 144 slides into slot 178 in second direction 184, readying the pot for relocation. Removal of truck 176 is the reverse of installation.

Figure 14:
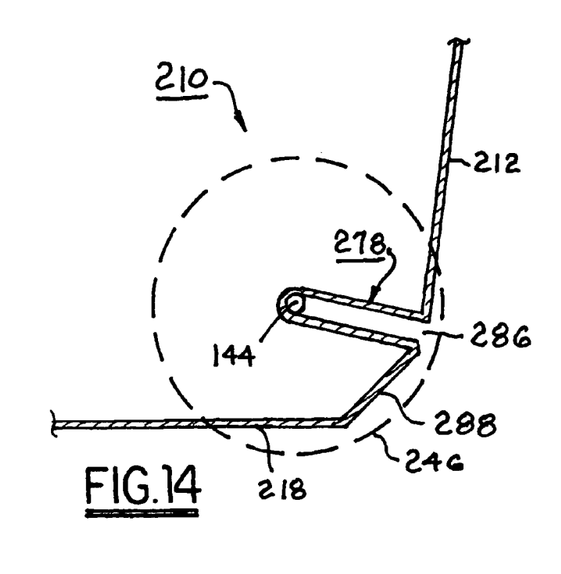
FIG. 14 is a cross-sectional view of a portion of a pot in accordance with the invention showing a second embodiment of a slot for receiving the truck shown in FIG. 12.

Referring to FIG. 14, a second embodiment 210 of a flowerpot having a removable wheeled truck comprises a slot 278 formed near the lower end of pot back 212. Preferably, slot 278 extends slightly upwards from its opening 286 such that axle 144 of truck 176 is readily entered into slot 278 by slightly elevating the rear corner 288 of the pot. Lowering pot 210 after the axle enters the slot serves to drive the axle all the way forward to the position shown in FIG. 14 wherein the pot assembly is ready for relocation. Again, removal of truck 176 is the reverse of installation.

Figure 15:
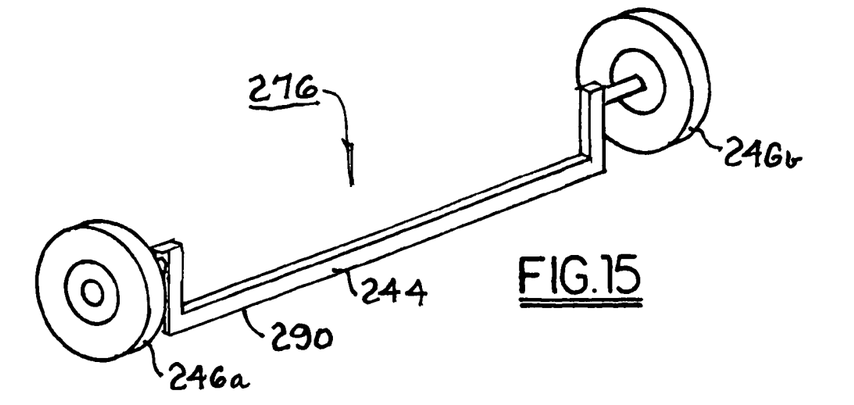
FIG. 15 is an isometric view of a second embodiment of a two-wheel truck, showing a drop axle.
Figure 16:
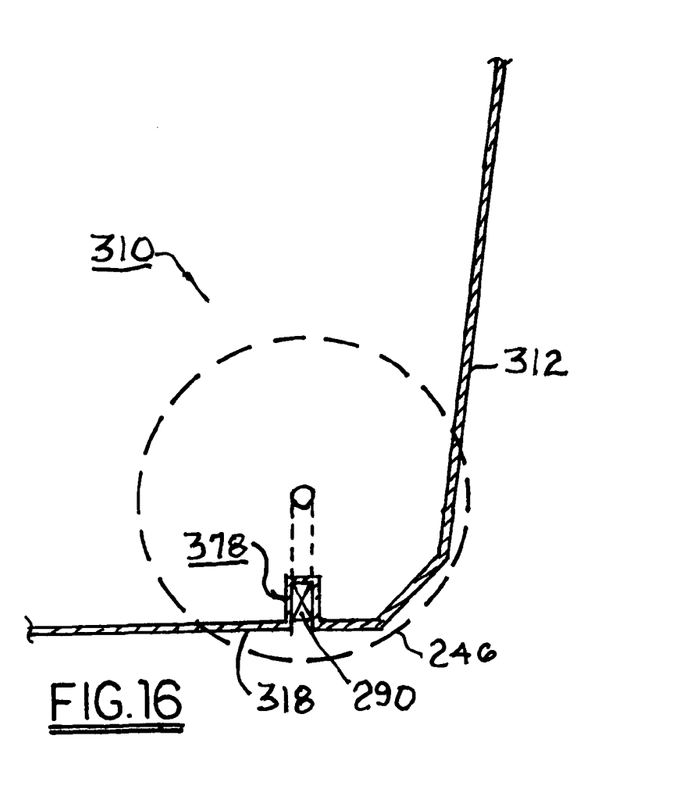
FIG. 16 is a cross-sectional view of a portion of a pot in accordance with the invention showing a first embodiment of a slot for receiving the drop axle truck shown in FIG. 15.

Referring to FIGS. 15 and 16, a second embodiment 276 of a two-wheeled truck comprises first and second wheels 246a, 246b mounted to opposite ends of a drop axle 244. Pot embodiment 310 comprises a low slot 378 formed in bottom 318 for receiving the dropped portion 290 of axle 244. Preferably, drop-axle 244 is rectangular a fits snugly within slot 378 to prevent flutter of the axle assembly about dropped portion 290 during use.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A wheeled flowerpot assembly for holding planting medium and one or more living plants, comprising:
 a) a pot-shaped element; and
 b) a wheel assembly including axle means mounted on said pot-shaped element and at least one rotatable element disposed on said axle means; and,
 c) a receptacle attached to said pot-shaped element for receiving a removable reattachable handle to tilt and relocate said assembly.

2. A wheeled flowerpot assembly in accordance with claim 1 wherein said pot-shaped element comprises:
 a) sides defining an opening at one end thereof; and
 b) a bottom attached to said sides opposite said opening.

3. A wheeled flowerpot assembly in accordance with claim 2 further comprising a rim formed on said sides and surrounding said opening.

4. A wheeled flowerpot assembly in accordance with claim 3 further comprising a reinforcement in said rim, said reinforcement having an opening therethrough.

5. A wheeled flowerpot assembly in accordance with claim 2 further comprising a reinforced region of said pot-shaped element at an intersection of said sides and said bottom.

6. A wheeled flowerpot assembly in accordance with claim 5 wherein said reinforced region includes a bore for receiving said axle means.

7. A wheeled flowerpot assembly in accordance with claim 6 wherein the distance of said bore from said bottom is greater than the radius of said rotatable element such that said rotatable element is spaced apart from a surface upon which said bottom of said assembly may rest when in non-relocation mode.

8. A wheeled flowerpot assembly in accordance with claim 7 wherein said bore is positioned in said pot-shaped element such that by being tipped said assembly may be brought into relocation mode wherein said rotatable element is in contact with said surface and said pot-shaped element is spaced apart from said surface.

9. A wheeled flowerpot assembly in accordance with claim 2 wherein said pot-shaped element comprises first and second flanges extending from said sides for receiving said wheel assembly.

10. A wheeled flowerpot assembly in accordance with claim 9 wherein said wheel assembly comprises first and second stub-axles disposed in bores in said first and second flanges, respectively, and first and second wheels are rotatably disposed on said first and second stub-axles, respectively.

11. A wheeled flowerpot assembly in accordance with claim 9 wherein said wheel assembly comprises bores through said first and second flanges, an axle extending through said bores, at least one roller disposed on said axle between said first and second flanges.

12. A wheeled flowerpot assembly in accordance with claim 1 wherein said receptacle is selected from the group consisting of a socket disposed on a side thereof for receiving an end of said handle and a detent formed in a side thereof.

13. A wheeled flowerpot assembly in accordance with claim 12 wherein said socket and said handle end are mutually threaded.

14. A wheeled flowerpot assembly in accordance with claim 1 wherein said pot-shaped element includes a transverse slot for removably receiving said wheel assembly.

15. A wheeled flowerpot assembly in accordance with claim 14 wherein said wheel assembly comprises a truck having first and second wheels mounted to opposite ends of an axle, and wherein said axle is removably insertable into said transverse slot.

16. A wheeled flowerpot assembly in accordance with claim 15 wherein said axle is a drop axle having a portion offset from the axes of said first and second wheels.

17. A wheeled flowerpot assembly in accordance with claim 16 wherein said portion is rectangular in cross-section.

* * * * *